US012686031B2

(12) United States Patent
Olberg et al.

(10) Patent No.: US 12,686,031 B2
(45) Date of Patent: Jul. 21, 2026

(54) APPLICATOR TOOLS, METHODS AND SYSTEMS FOR COATING A BORE

(71) Applicant: The Boeing Company, Arlington, VA (US)

(72) Inventors: Jeffrey H. Olberg, Federal Way, WA (US); Sean D. Morden, Federal Way, WA (US); Bradley G. Silva, Renton, WA (US)

(73) Assignee: The Boeing Company, Arlington, VA (US)

( * ) Notice: Subject to any disclaimer, the term of this patent is extended or adjusted under 35 U.S.C. 154(b) by 278 days.

(21) Appl. No.: 18/348,459

(22) Filed: Jul. 7, 2023

(65) Prior Publication Data

US 2025/0010333 A1 Jan. 9, 2025

(51) Int. Cl.
*B05D 7/22* (2006.01)
*B05C 7/06* (2006.01)
*B05D 1/28* (2006.01)

(52) U.S. Cl.
CPC .................. *B05D 7/22* (2013.01); *B05C 7/06* (2013.01); *B05D 1/28* (2013.01); *B05D 2259/00* (2013.01)

(58) Field of Classification Search
None
See application file for complete search history.

(56) References Cited

U.S. PATENT DOCUMENTS 4,800,882 A * 1/1989 Gianturco ............... A61F 2/885 606/194
2013/0259604 A1 10/2013 Whitlock et al.
2014/0055906 A1 2/2014 Whitlock et al.

* cited by examiner

*Primary Examiner* — James C Yager
(74) *Attorney, Agent, or Firm* — Walters & Wasylyna LLC

(57) ABSTRACT

An applicator tool for coating a bore includes a tubular body and an inflatable bladder. The tubular body includes a proximal end and a distal end opposing the proximal end along a longitudinal axis. The tubular body also includes an expansion portion proximate the distal end and an internal volume in relation to the expansion portion. The inflatable bladder disposed within the internal volume of the tubular body in relation to the expansion portion. A method for coating a bore includes inserting an expansion portion of an applicator tool into the bore. A coating material having been previously disposed on the expansion portion. The method also includes applying a pressurized fluid to the applicator tool to expand the expansion portion within the bore and rotating the applicator tool to apply the coating material from the expansion portion to the bore. A system that includes the applicator tool is also disclosed.

20 Claims, 18 Drawing Sheets

APPLICATOR TOOLS, METHODS AND SYSTEMS FOR COATING A BORE

FIELD

The present disclosure relates generally to applying a malleable and conductive material on a cylindrical surface of a bore during composite manufacturing and, particularly, to transferring a coating material from an applicator tool to the surface of the bore. The bore, for example, receives a fastener to secure mating parts, including at least one composite part, together during composite manufacture. The coating material improves conductivity through the installed fastener and the mating parts. The applicator tool may be used in machined holes of carbon fiber reinforced panels and mating panels for aerospace construction. Various other applications of the applicator in various other types of construction and manufacturing are also contemplated. Additionally, various methods and systems for coating a bore using the applicator tool are contemplated.

BACKGROUND

Current techniques for applying conductive coatings to the surface of a fastener hole provide limited conductivity as to the fasteners and the mating parts. The current techniques are also time-consuming and unreliable. For example, a bolt with some material melted around it has been inserted into the fastener hole and spun with a drill. However, this technique does not permit a controlled contact between the bolt and the fastener hole and does not use replaceable parts. Rather, use of the coated bolt results in angular contact with the fastener hole and uneven pressure between the coating and the hole surface.

Accordingly, those skilled in the art continue with research and development efforts to improve techniques for applying conductive materials to fastener holes during composite manufacturing.

SUMMARY

Disclosed are examples of applicator tools, methods and systems for coating a bore. The following is a non-exhaustive list of examples, which may or may not be claimed, of the subject matter according to the present disclosure.

In an example, the disclosed applicator tool for coating a bore includes a tubular body and an inflatable bladder. The tubular body includes a proximal end and a distal end opposing the proximal end along a longitudinal axis of the tubular body. The tubular body also includes an expansion portion proximate the distal end and an internal volume in relation to the expansion portion. The inflatable bladder disposed within the internal volume of the tubular body in relation to the expansion portion.

In an example, the disclosed method for coating a bore includes: (1) inserting an expansion portion of an applicator tool into the bore. A coating material having been previously disposed on the expansion portion. In this example, the disclosed method also includes: (2) applying a pressurized fluid to the applicator tool to expand the expansion portion within the bore and (3) rotating the applicator tool to apply the coating material from the expansion portion to the bore.

In an example, the disclosed system for coating a bore includes an applicator tool configured to coat a bore. The applicator tool includes a tubular body and inflatable bladder. The tubular body includes a proximal end and a distal end opposing the proximal end along a longitudinal axis of the tubular body. The tubular body also includes an expansion portion proximate the distal end and an internal volume in relation to the expansion portion. The inflatable bladder assembly is disposed within the internal volume of the tubular body in relation to the expansion portion. The inflatable bladder assembly includes an inflatable bladder, a first end member, a first sleeve, a second end member and a second sleeve. The inflatable bladder includes a first open end closer to the proximal end of the tubular body and a second open end closer to the distal end of the tubular body. The first end member includes a first portion sized for insertion into the internal volume and a second portion sized for insertion into the first open end of the inflatable bladder. The first sleeve securing the first open end of the inflatable bladder on the second portion of the first end member. The first sleeve sealing the first open end of the inflatable bladder. The second end member includes a first portion sized for insertion into the internal volume and a second portion sized for insertion into the second open end of the inflatable bladder. The second sleeve securing the second open end of the inflatable bladder on the second portion of the second end member. The second sleeve seals the second open end of the inflatable bladder.

Other examples of the disclosed applicator tools, methods and systems for coating a bore will become apparent from the following detailed description, the accompanying drawings and the appended claims.

DETAILED DESCRIPTION

The various examples of an applicator tool, methods and systems for coating a bore disclosed herein provide techniques for applying a malleable and highly conductive material to the surface of a fastener hole, for example, in carbon reinforced panels used for aerospace construction. The coating material may be an indium or an indium alloy. The coating material applied to the cylindrical surface of the fastener hole provides conductivity through the installed fastener and mating parts.

Figure 1A:
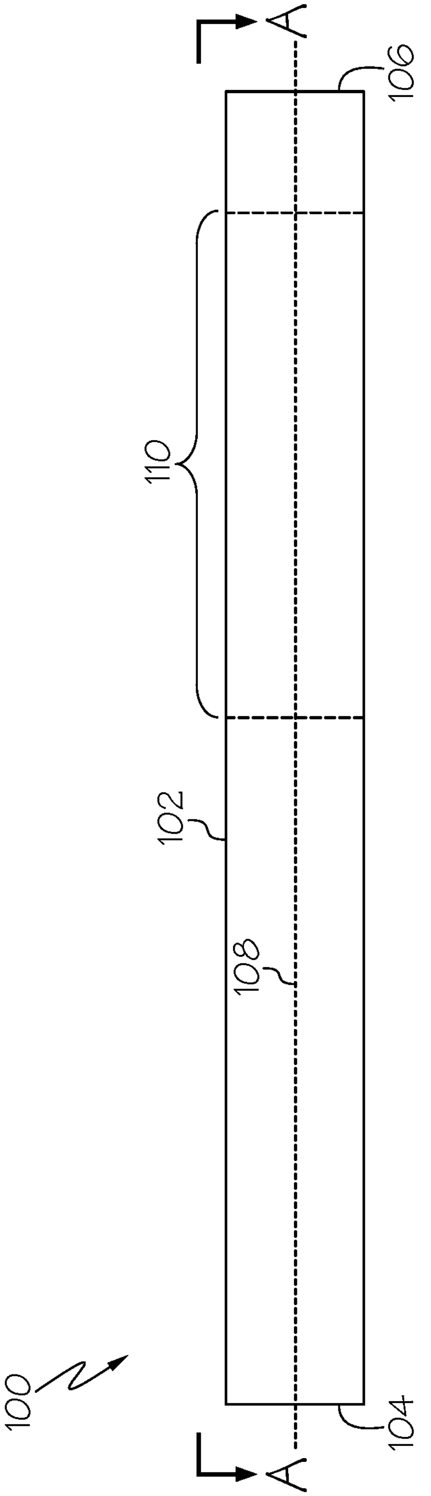
FIG. 1A is a top view of an example of an applicator tool for coating a bore.
Figure 1B:
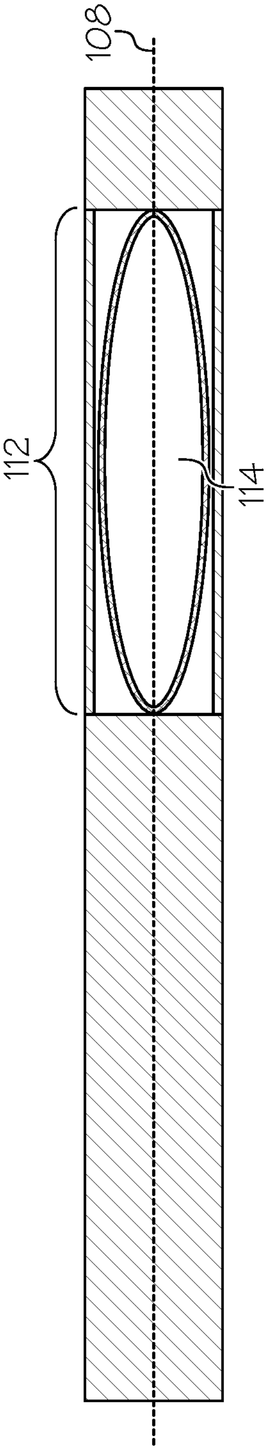
FIG. 1B is an A-A cross-sectional view of an example of the applicator tool of FIG. 1.
Figure 2A:
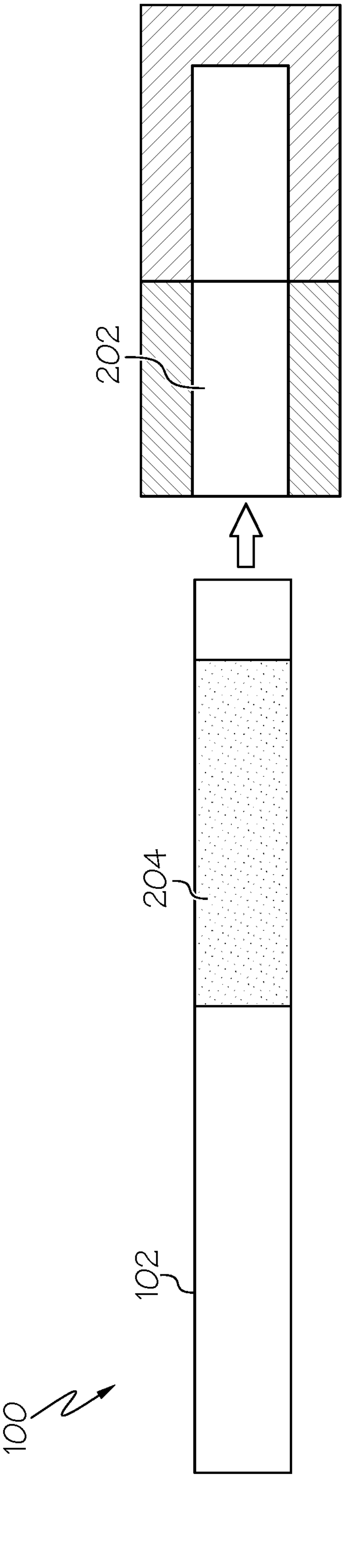
FIGS. 2A-B are functional diagrams showing the applicator tool of FIG. 1 with a cross-sectional view of an example of a bore in conjunction with transfer of an example of a coating material from the applicator tool to a surface of the bore.
Figure 2B:
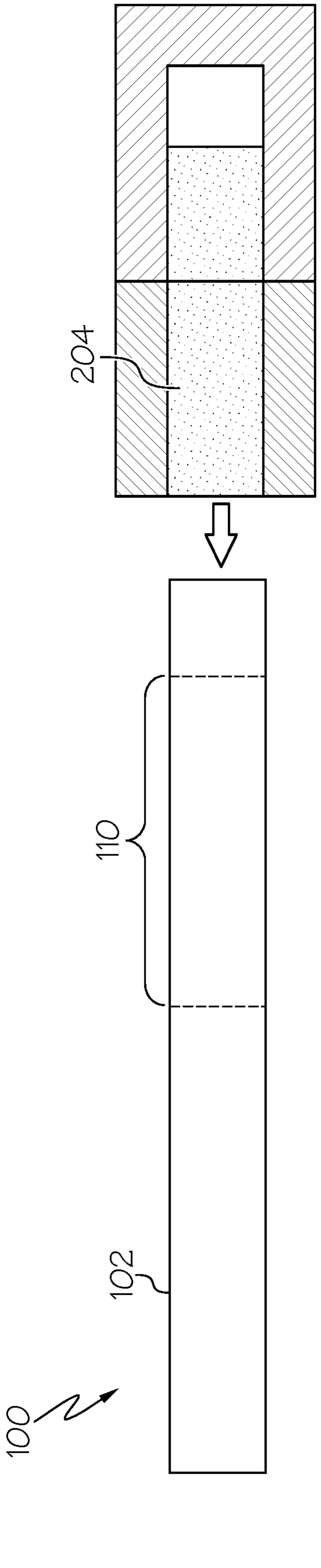
Figure 3A:
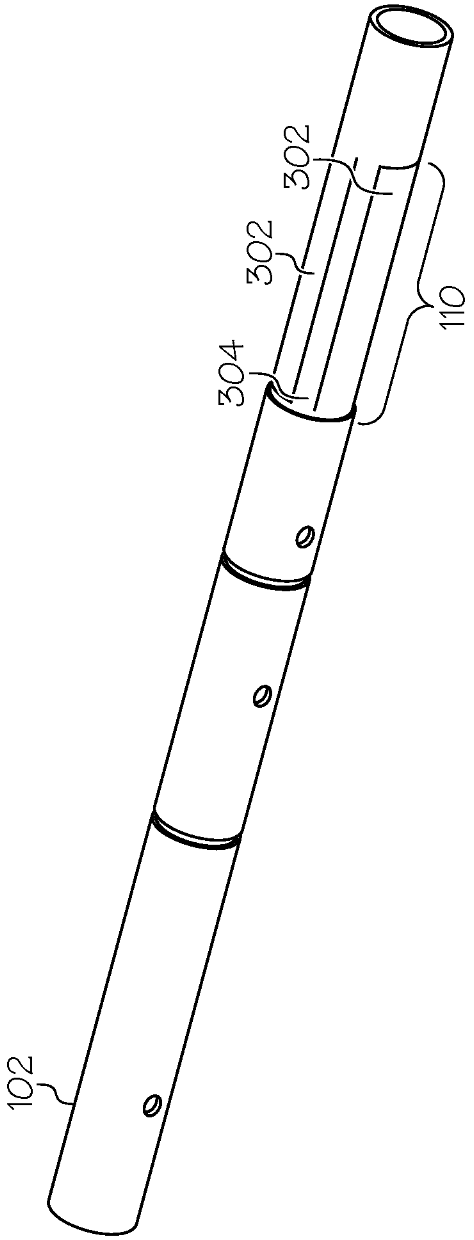
FIG. 3A is an isometric side view of an example of a tubular body for an applicator tool.
Figure 3B:
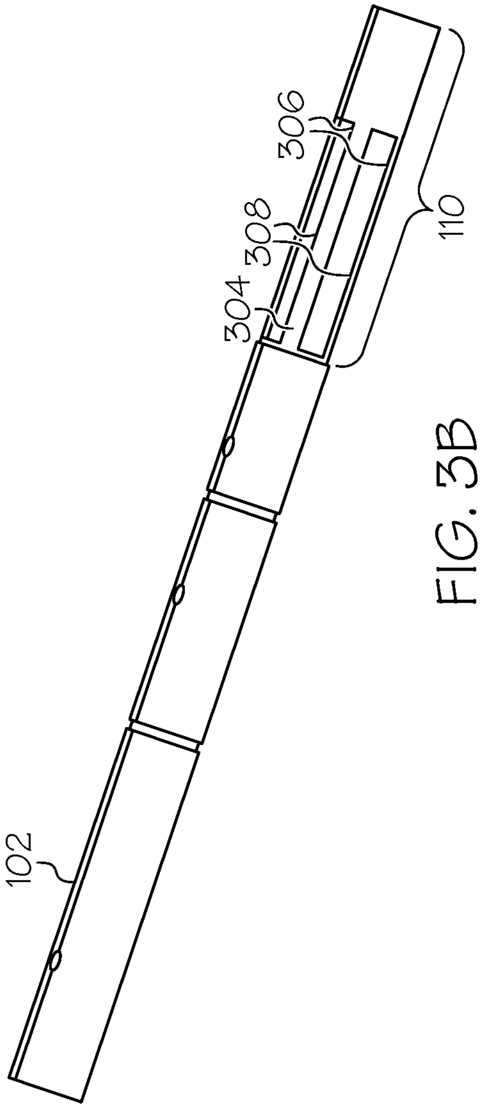
FIG. 3B is a rotated side view of another example of a tubular body for an applicator tool.
Figure 3C:
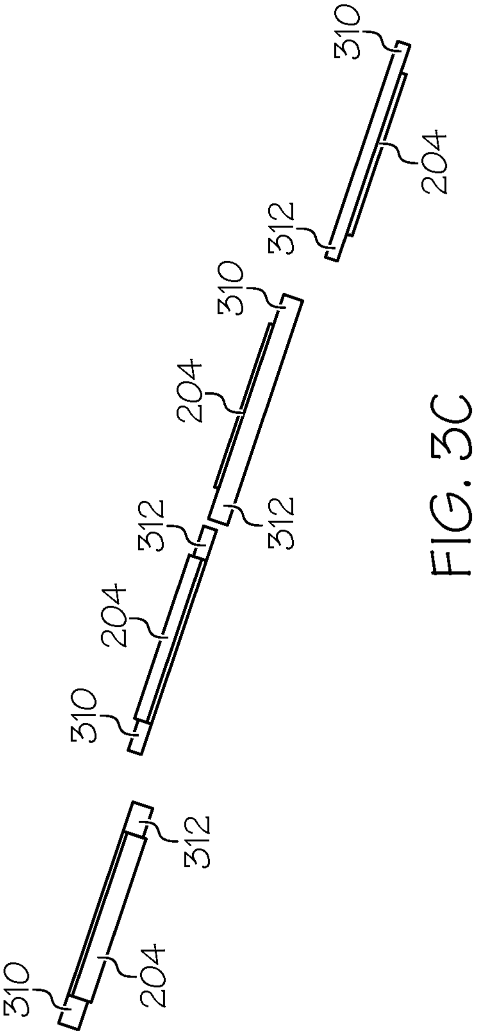
FIG. 3C is a rotated side view of an example of a plurality of coated inserts for the tubular body of FIG. 3B.
Figure 4:
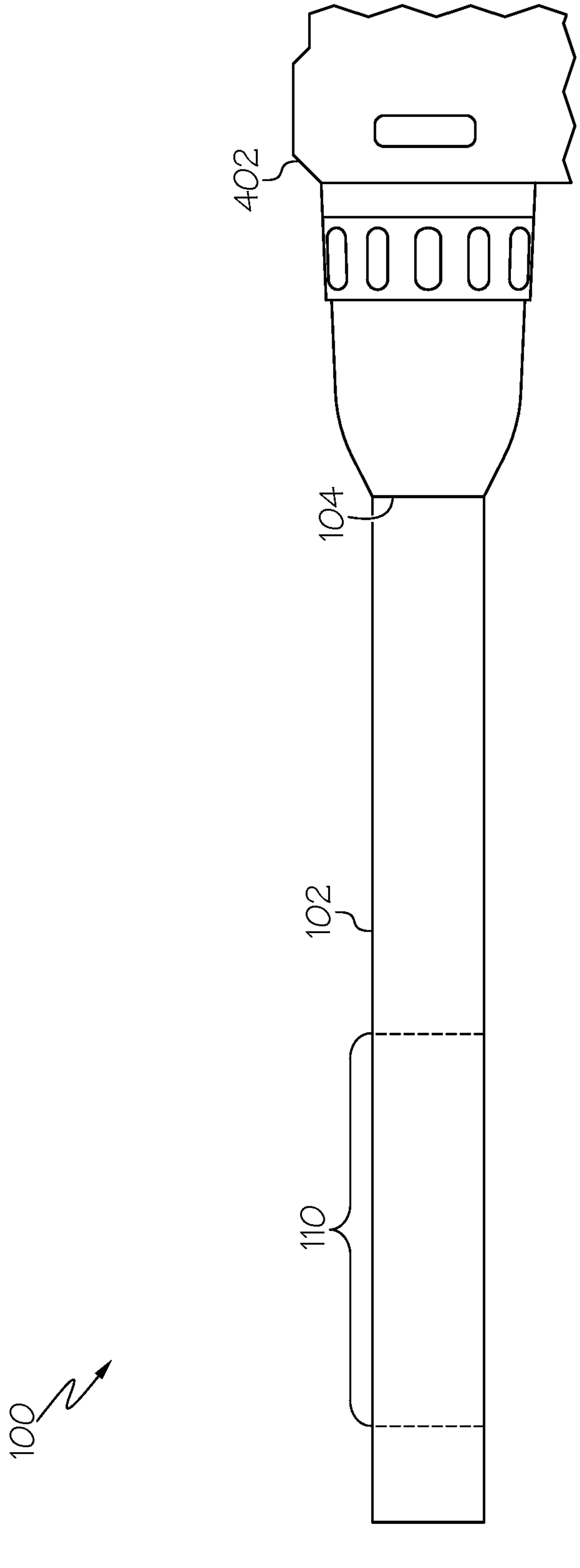
FIG. 4 is a top view showing the applicator tool of FIG. 1 coupled to an example of a rotational drive assembly.
Figure 5:
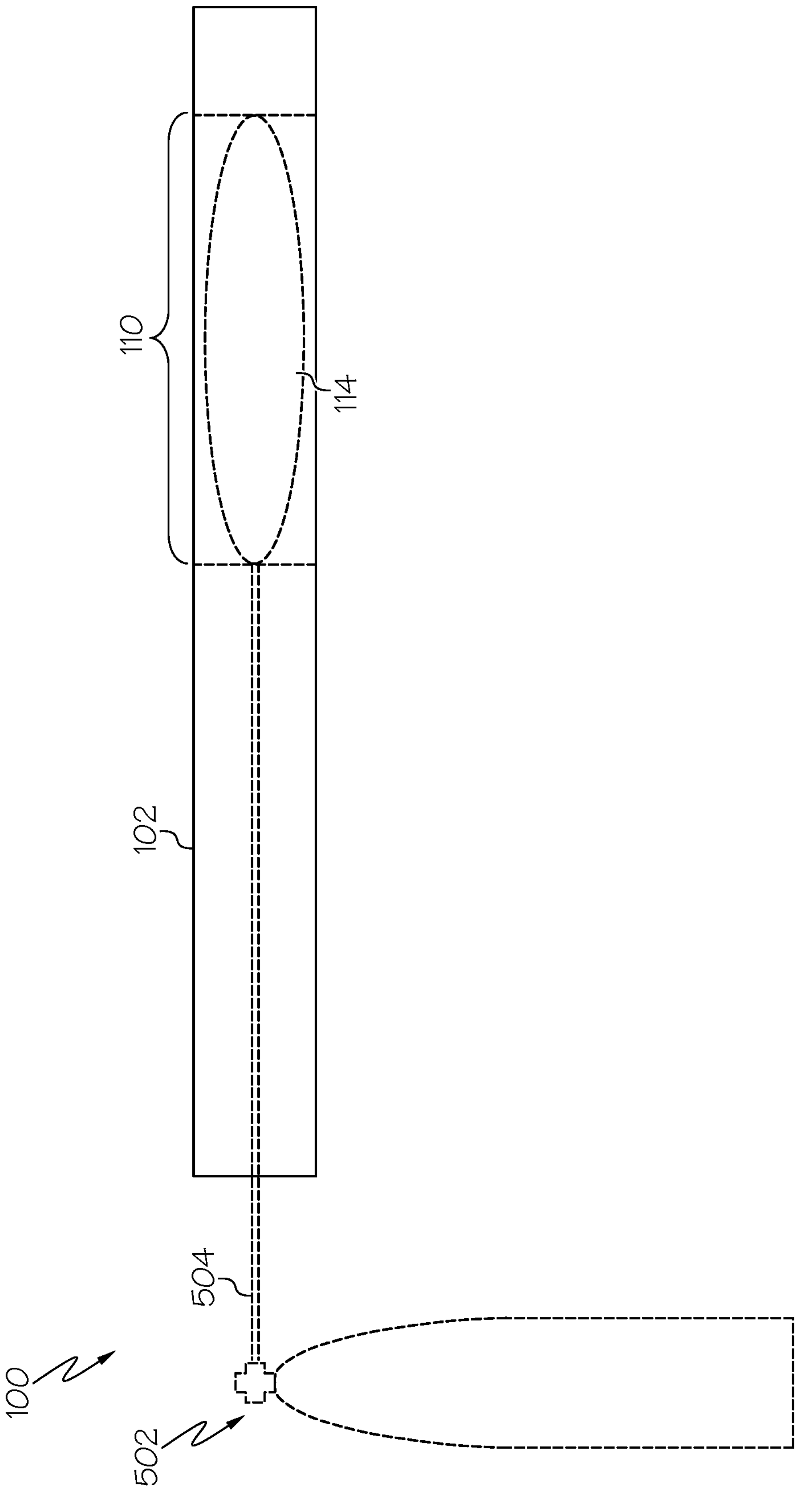
FIG. 5 is a functional diagram showing an example of an inflatable bladder within the applicator tool of FIG. 1 and coupled to an example of a compressed fluid source.
Figure 6:
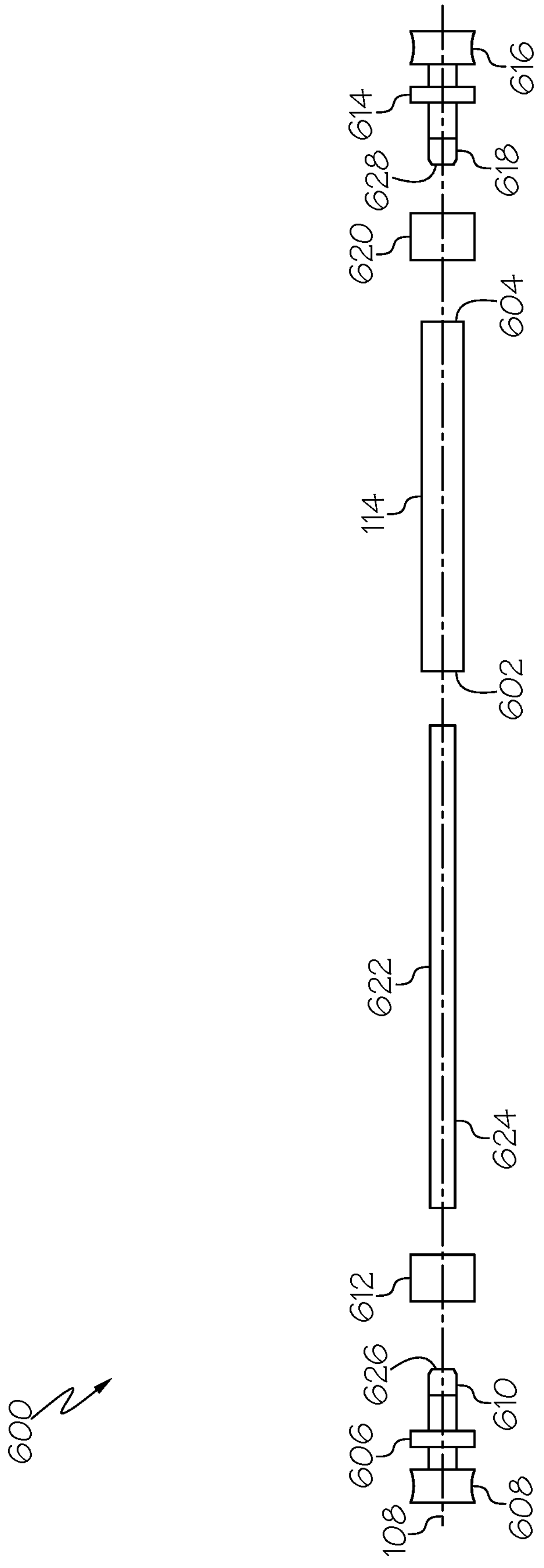
FIG. 6 is an exploded top view of an example of an inflatable bladder assembly for an applicator tool.
Figure 7:
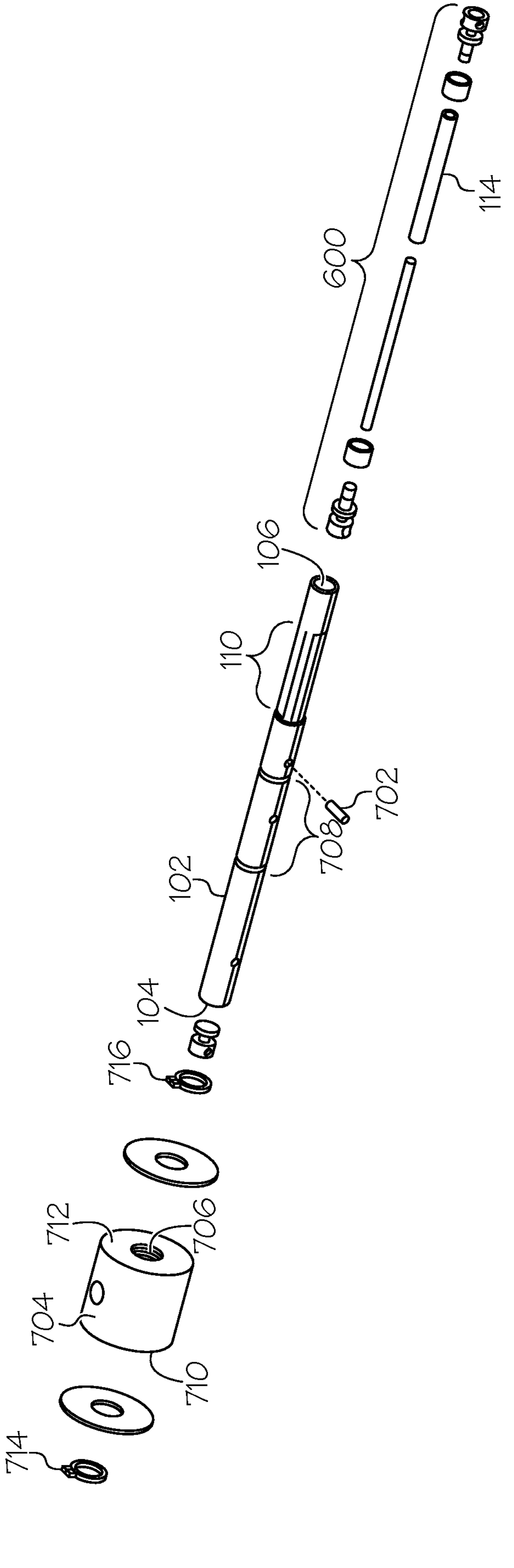
FIG. 7 is an exploded isometric side view of another example of an applicator tool.
Figure 8:
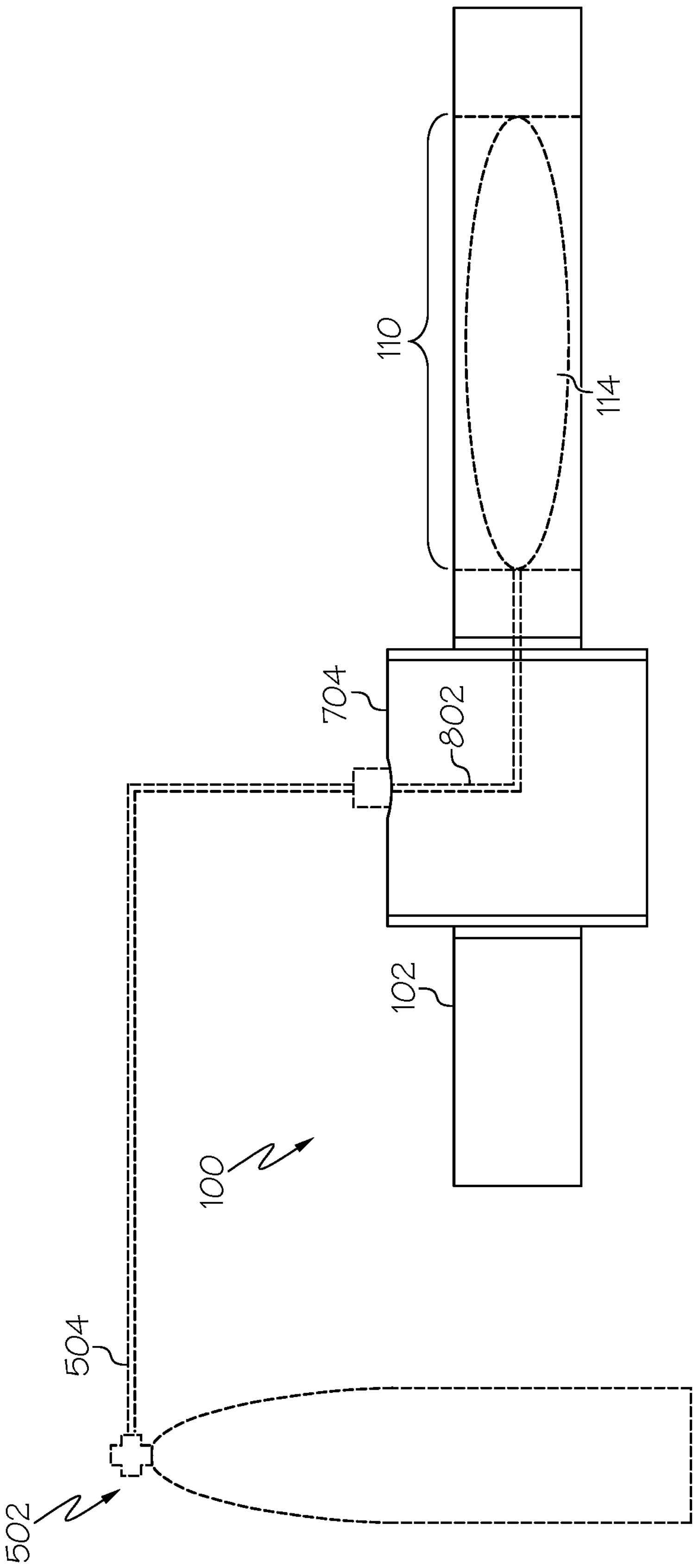
FIG. 8 is a functional diagram showing an example of an inflatable bladder within the applicator tool of FIG. 7 and coupled to another example of a compressed fluid source via an example of a rotation air inlet coupling.
Figure 9:
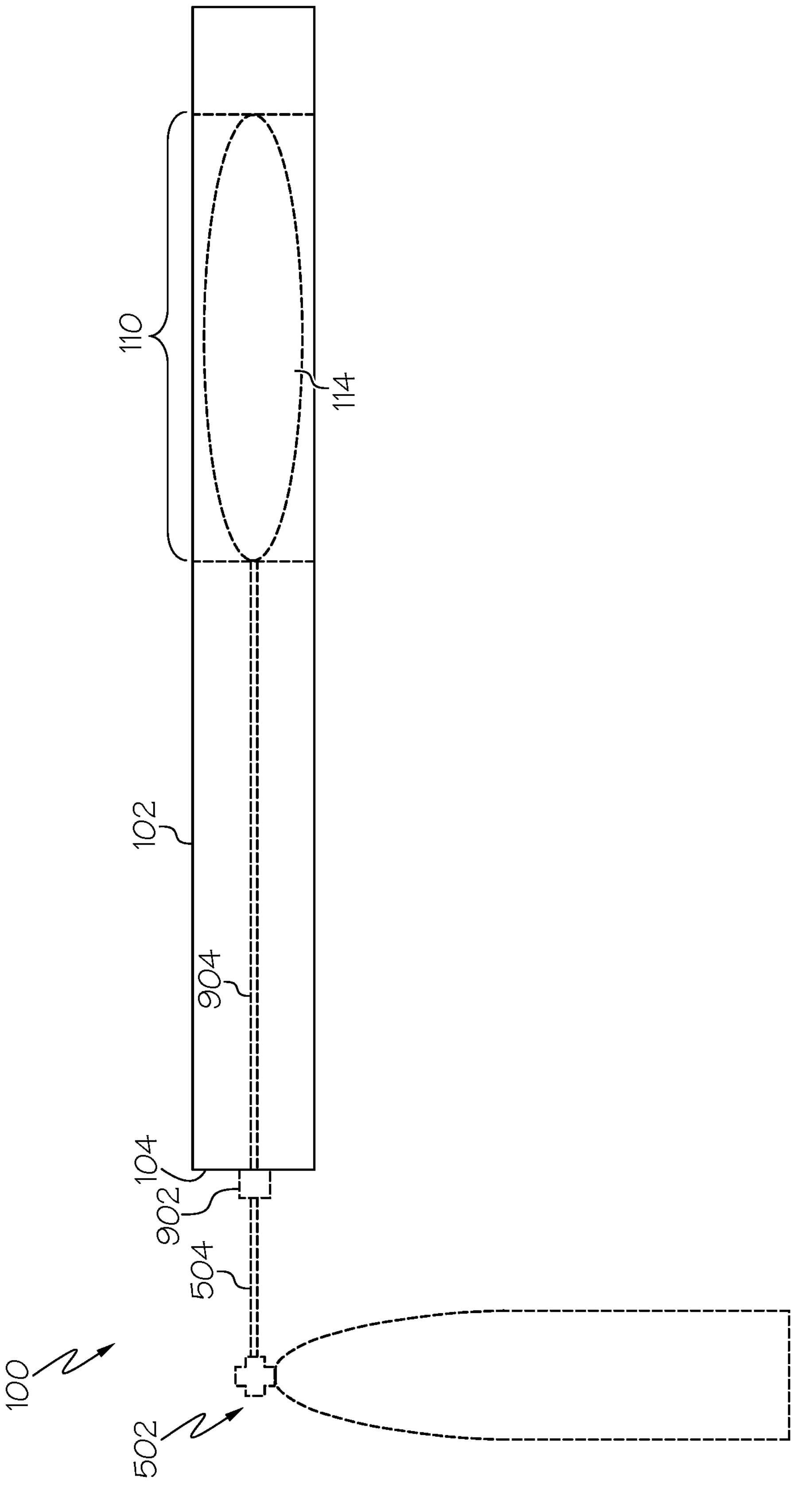
FIG. 9 is a functional diagram showing another example of an inflatable bladder within another example of the applicator tool and coupled to yet another example of a compressed fluid source via an example of a rotation air inlet connector.
Figure 10:
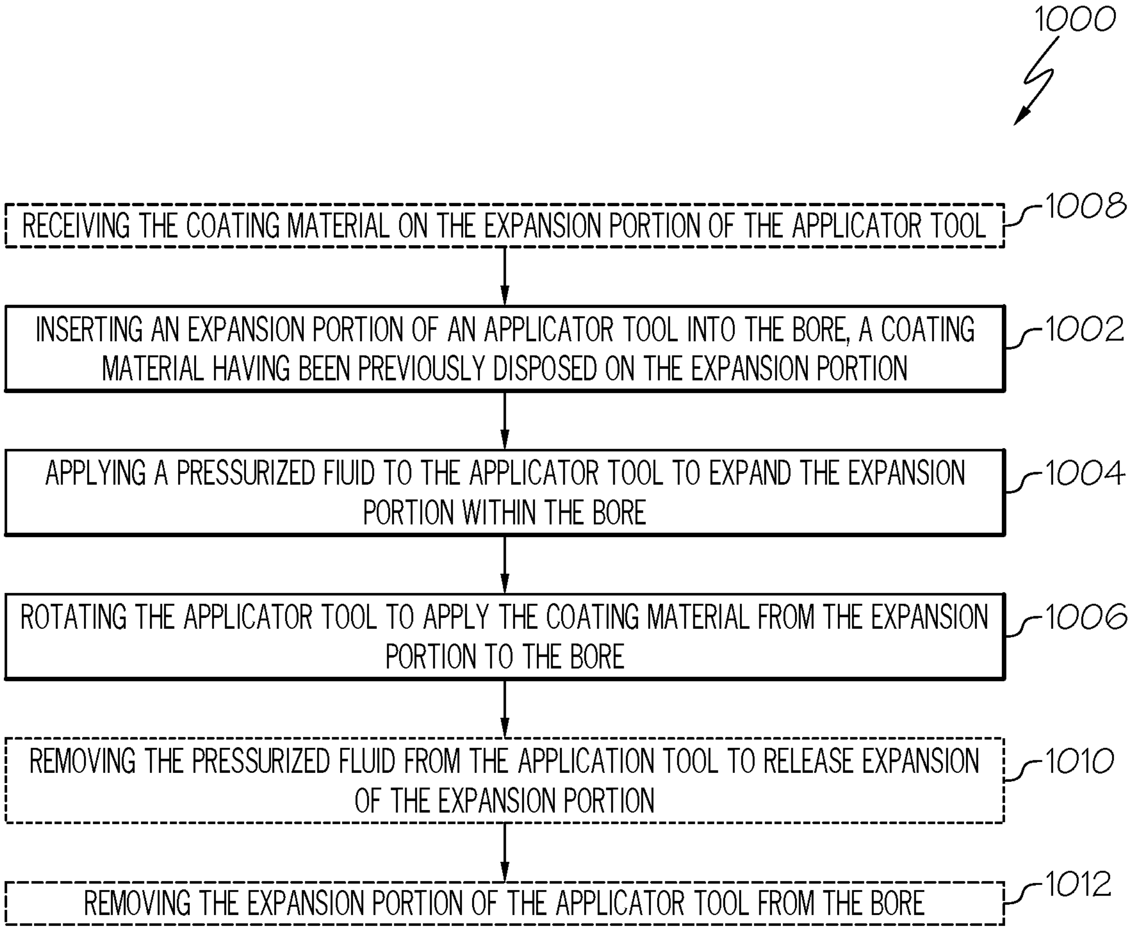
FIG. 10 is a flow diagram of an example of a method for coating a bore.
Figure 11:
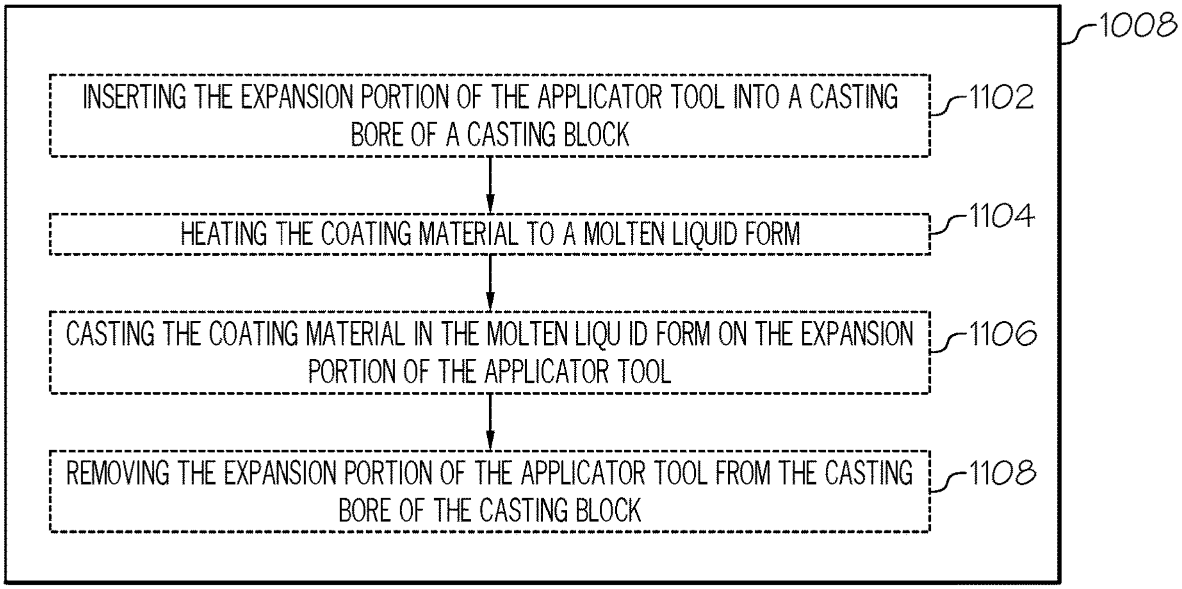
FIG. 11, in combination with FIG. 10, is a flow diagram of another example of a method for coating a bore.
Figure 12A:
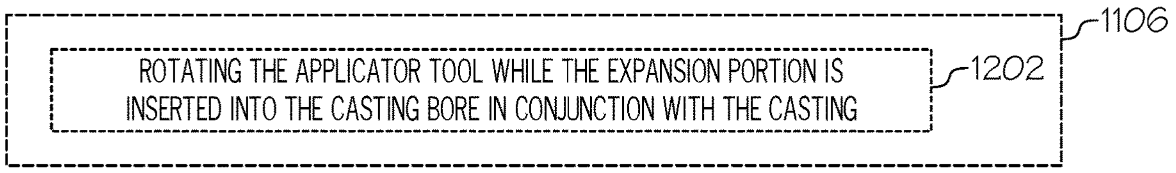
FIGS. 12A through 12C, in combination with FIGS. 10 and 11, provide flow diagrams of further examples of a method for coating a bore.
Figure 12B:
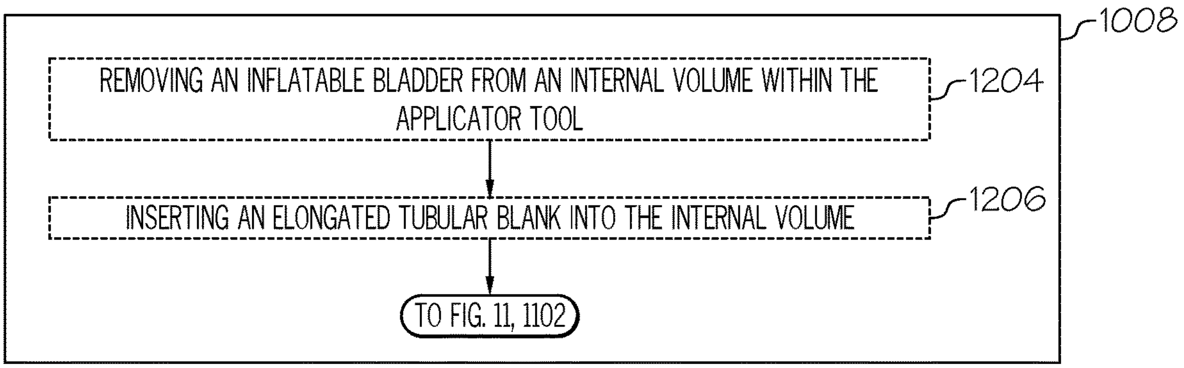
Figure 12C:
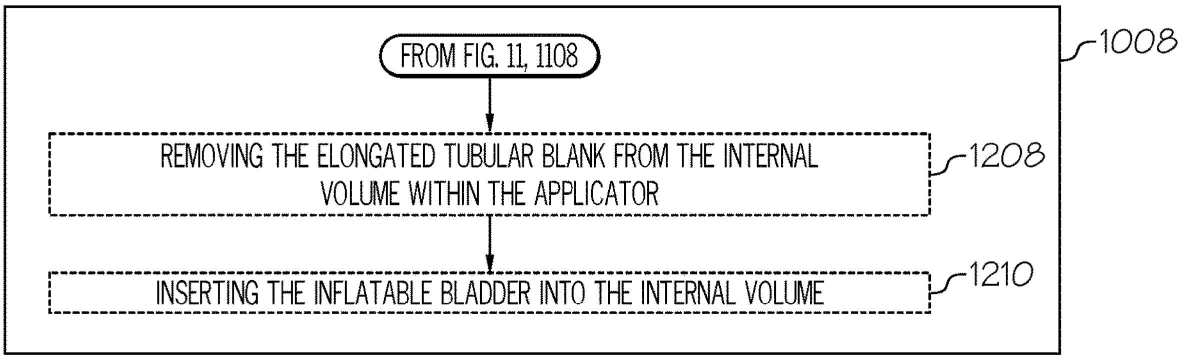
Figure 13:
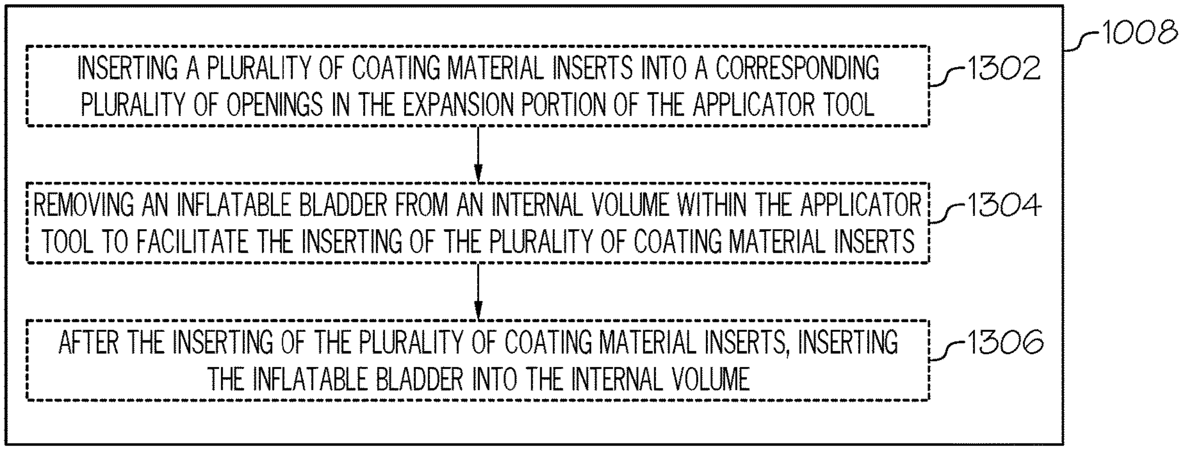
FIG. 13, in combination with FIG. 10, is a flow diagram of still another example of a method for coating a bore.
Figure 14:
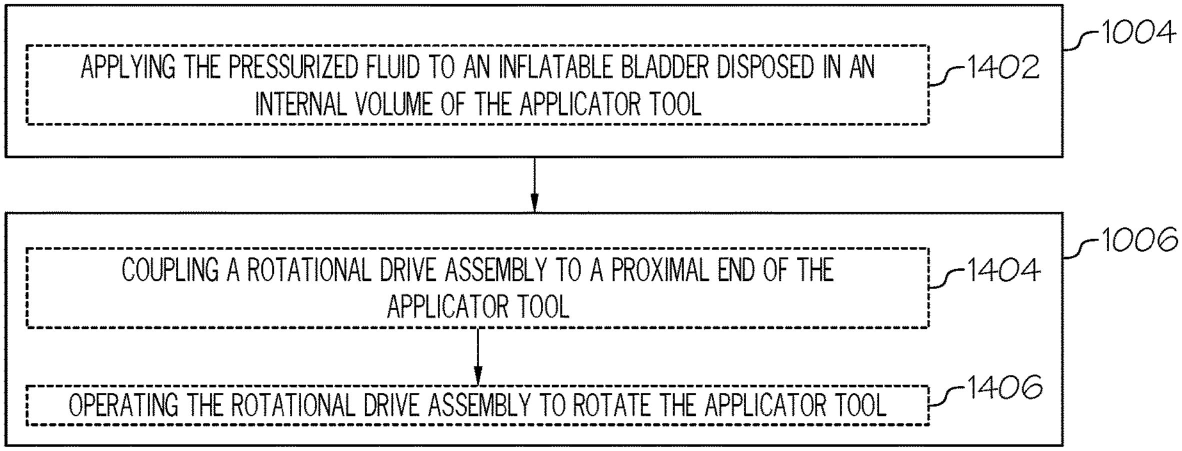
FIG. 14, in combination with FIG. 10, is a flow diagram of still yet another example of a method for coating a bore.

Referring generally to FIGS. 1A, 1B, 2A-B, 3A-C and 4-9, by way of examples, the present disclosure is directed to an applicator tool 100 for coating a bore 202. FIG. 1A discloses an example of the applicator tool 100. FIG. 1B shows a cross-section of the applicator tool 100 of FIG. 1A. FIGS. 2A-B provide functional diagrams showing the applicator tool 100 used to apply a coating material 204 to a surface of a bore 202. FIGS. 3A-C show examples of several types of the tubular bodies 102 that may be implemented in the applicator tool 100. FIG. 3 shows the applicator tool 100 coupled to a rotational drive assembly 402. FIG. 5 shows an example of an inflatable bladder 114 for the applicator tool 100 connected to a compressed fluid source 502. FIG. 6 provides an exploded view of an inflatable bladder assembly 600 that may be implemented in the applicator tool 100. FIG. 7 provides an exploded view of another example of the applicator tool 100. FIG. 8 provides a functional diagram showing the inflatable bladder 114 for the applicator tool 100 connected to a compressed fluid source 502 via a rotation air inlet coupling 704. FIG. 9 provides a functional diagram showing the inflatable bladder 114 for the applicator tool 100 connected to a compressed fluid source 502 via a rotation air inlet connector 902.

With reference again to FIGS. 1A, 1B, 2A-B, 3A-C and 4-9, in one or more examples, applicator tool 100 for coating a bore 202 includes a tubular body 102 and an inflatable bladder 114. The tubular body 102 includes a proximal end 104 and a distal end 106 opposing the proximal end 104 along a longitudinal axis 108 of the tubular body 102. The tubular body 102 also includes an expansion portion 110 proximate the distal end 106 and an internal volume 112 in relation to the expansion portion 110. The inflatable bladder 114 is disposed within the internal volume 112 of the tubular body 102 in relation to the expansion portion 110.

In another example of the applicator tool 100, the tubular body 102 includes a metallic material. In a further example, the metallic material includes a stainless steel, a titanium, a titanium alloy, a cobalt-chromium alloy, a nickel-titanium alloy, or any other suitable metallic material in any suitable combination.

In yet another example of the applicator tool 100, the expansion portion 110 of the tubular body 102 includes a plurality of interleaved fingers 302 cut into a surface 304 of the tubular body 102 to form the expansion portion 110 such that the expansion portion 110 is integrally formed with the tubular body 102. In a further example, the plurality of interleaved fingers 302 are configured to receive a coating material 204 for coating the bore 202.

In still another example of the applicator tool 100, the expansion portion 110 of the tubular body 102 includes a plurality of cutouts 306 in a surface 304 of the tubular body 102 to form openings 308 in the expansion portion 110. In a further example, the expansion portion 110 of the tubular body 102 also includes a plurality of coated inserts 310 underlying the plurality of cutouts 306. Each coated insert 310 includes a substrate 312 with a coating material 204 previously deposited on the substrate 312 for coating the bore 202.

In still yet another example of the applicator tool 100, the applicator tool 100 is sized for insertion into the bore 202.

In another example of the applicator tool 100, the proximal end 104 of the tubular body 102 is configured for coupling with a rotational drive assembly 402. In a further example, rotational drive assembly 402 includes a hand tool, a power hand tool, a robotic arm or any other suitable rotational drive assembly in any suitable combination. In another further example, the expansion portion 110 of the tubular body 102 is configured to coat the bore 202 with a coating material 204 in response to rotation of the applicator tool 100 by the rotational drive assembly 402. In an even further example, the coating material 204 includes a conductive gap filler, indium, an indium alloy, tin, a tin alloy, lead, a lead alloy, a copper, a copper alloy, a silver, a silver alloy, a gold, a gold alloy, a platinum, a platinum alloy, a graphite, a graphite alloy or any other suitable coating material in any suitable combination.

In yet another example of the applicator tool 100, the inflatable bladder 114 is configured for fluid communication with a compressed fluid source 502 to expand the inflatable bladder 114 in response to pressurized fluid 504 received from the compressed fluid source 502. The expansion of the inflatable bladder 114 applies an expansive force to the expansion portion 110 of the tubular body 102 in response to the pressurized fluid 504. In a further example, the inflatable bladder 114 is configured to deflate in response to removal of the pressurized fluid 504 and to release the expansive force on the expansion portion 110 of the tubular body 102 in response to the removal of the pressurized fluid 504.

In still another example of the applicator tool 100, the inflatable bladder 114 is configured for insertion into the tubular body 102 at the distal end 106.

In still yet another example, the applicator tool 100 also includes an inflatable bladder assembly 600 disposed within the internal volume 112 of the tubular body 102 in relation to the expansion portion 110. The inflatable bladder assembly 600 includes the inflatable bladder 114, a first end member 606, a first sleeve 612, a second end member 614 and a second sleeve 620. The inflatable bladder 114 includes a first open end 602 closer to the proximal end 104 of the tubular body 102 and a second open end 604 closer to the distal end 106 of the tubular body 102. The first end member 606 includes a first portion 608 sized for insertion into the internal volume 112 and a second portion 610 sized for insertion into the first open end 602 of the inflatable bladder 114. The first sleeve 612 securing the first open end 602 of the inflatable bladder 114 on the second portion 610 of the first end member 606. The first sleeve 612 sealing the first open end 602 of the inflatable bladder 114. The second end member 614 includes a first portion 616 sized for insertion into the internal volume 112 and a second portion 618 sized for insertion into the second open end 604 of the inflatable bladder 114. The second sleeve 620 securing the second open end 604 of the inflatable bladder 114 on the second portion 618 of the second end member 614. The second sleeve 620 sealing the second open end 604 of the inflatable bladder 114.

In a further example of the applicator tool 100, the inflatable bladder assembly 600 also includes a rod member 622 extending between the first end member 606 and the second end member 614 along the longitudinal axis 108 of the tubular body 102. The rod member 622 disposed within the inflatable bladder 114 and configured to provide longitudinal support to the inflatable bladder assembly 600 in relation to insertion and extraction of the inflatable bladder assembly 600 from the internal volume 112 of the tubular body 102. In an even further example, the rod member 622 includes a threaded rod 624 received within a first threaded bore 626 of the first end member 606 and a second threaded bore 628 of the second end member 614.

In another further example, the applicator tool 100 also includes a bladder retaining mechanism 702 securing the inflatable bladder assembly 600 within the internal volume 112 of the tubular body 102. In an even further example, the bladder retaining mechanism 702 includes a dowel pin, a roll pin, a spring pin, a set screw or any other suitable retaining mechanism in any suitable combination.

In another example, the applicator tool 100 also includes a rotation air inlet coupling 704, a first retaining mechanism 714, a second retaining mechanism 716 and an air inlet path 802. The rotation air inlet coupling 704 including a central bore 706 along the longitudinal axis 108 of the tubular body 102. The tubular body 102 inserted through the central bore 706 such that the rotation air inlet coupling 704 is disposed proximate a central portion 708 of the tubular body 102 between the proximal end 104 and the expansion portion 110. The rotation air inlet coupling 704 also includes a first end 710 closer to the proximal end 104 of the tubular body 102 and a second end 712 closer to the expansion portion 110 of the tubular body 102. The first retaining mechanism 714 disposed on the tubular body 102 at the first end 710 of the rotation air inlet coupling 704 to prevent the rotation air inlet coupling 704 from movement toward the proximal end 104. The second retaining mechanism 716 disposed on the tubular body 102 at the second end 712 of the rotation air inlet coupling 704 to prevent the rotation air inlet coupling 704 from movement toward the expansion portion 110. The air inlet path 802 extends from the rotation air inlet coupling 704 to the inflatable bladder 114 within the tubular body 102.

In a further example of the applicator tool 100, the rotation air inlet coupling 704 is configured for fluid communication with a compressed fluid source 502 to supply a pressurized fluid 504 received from the compressed fluid source 502 to the inflatable bladder 114 via the air inlet path 802. The inflatable bladder 114 is configured to expand in response to receipt of the pressurized fluid 504. Expansion of the inflatable bladder 114 applying an expansive force to the expansion portion 110 of the tubular body 102 in response to the pressurized fluid 504. In an even further example, the inflatable bladder 114 is configured to deflate in response to removal of the pressurized fluid 504 from the rotation air inlet coupling 704 and to release the expansive force on the expansion portion 110 of the tubular body 102 in response to the removal of the pressurized fluid 504.

In yet another example, the applicator tool 100 also includes a rotation air inlet connector 902 and an air inlet path 904. The rotation air inlet connector 902 disposed at or near the proximal end 104 of the tubular body 102 along the longitudinal axis 108 of the tubular body 102. The air inlet path 904 extends from the rotation air inlet connector 902 to the inflatable bladder 114 within the tubular body 102.

In a further example of the applicator tool 100, the rotation air inlet connector 902 is configured for fluid communication with a compressed fluid source 502 to supply a pressurized fluid 504 received from the compressed fluid source 502 to the inflatable bladder 114 via the air inlet path 904. The inflatable bladder 114 is configured to expand in response to receipt of the pressurized fluid 504. Expansion of the inflatable bladder 114 applying an expansive force to the expansion portion 110 of the tubular body 102 in response to the pressurized fluid 504. In an even further example, the inflatable bladder 114 is configured to deflate in response to removal of the pressurized fluid 504 from the rotation air inlet connector 902 and to release the expansive force on the expansion portion 110 of the tubular body 102 in response to the removal of the pressurized fluid 504.

Figure 15:
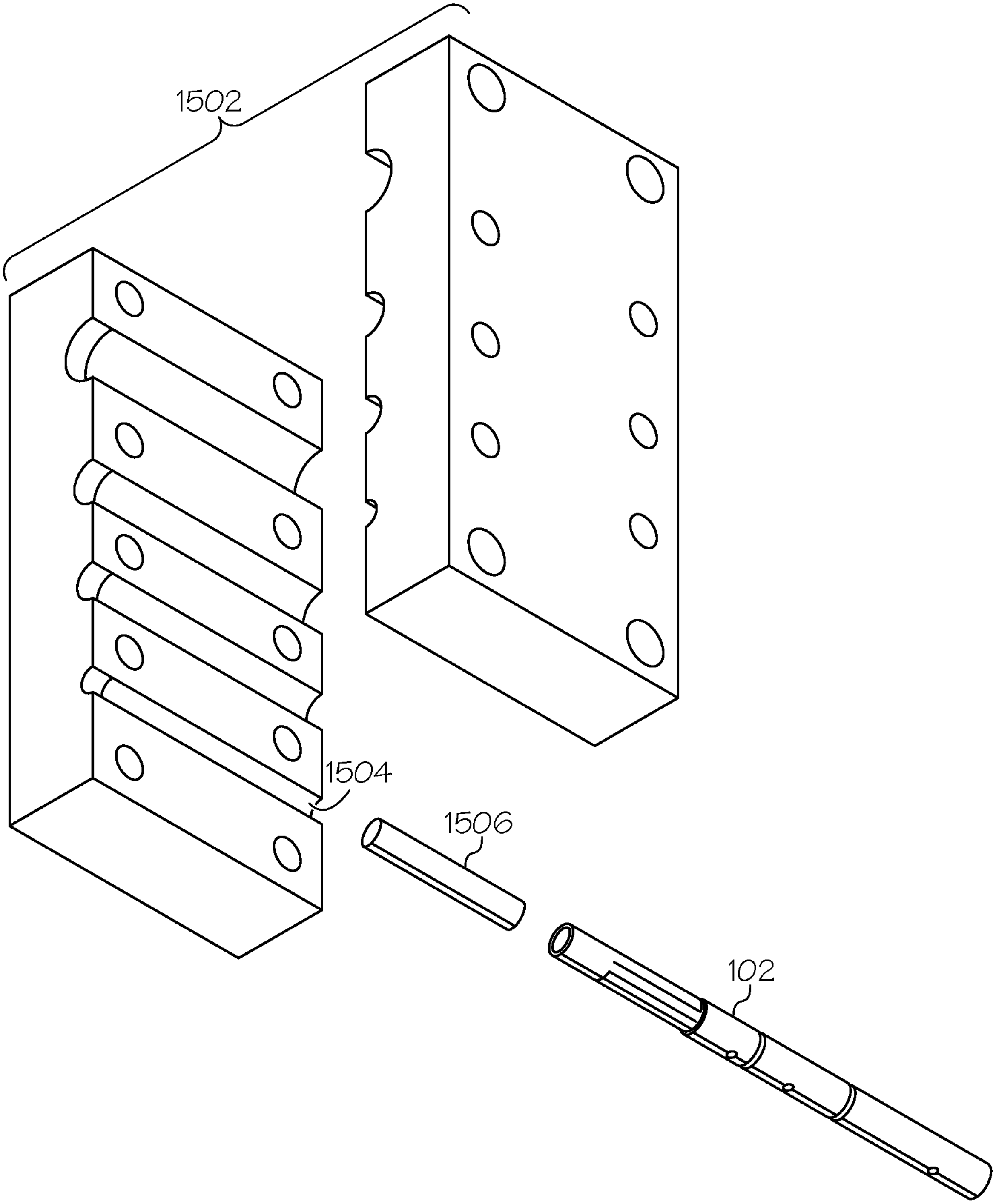
FIG. 15 is an exploded isometric side view of an example of a casting block and an example of a tubular body prepared for casting an example of a coating material on an example of an expansion portion of the tubular body.

Referring generally to FIGS. 1A, 1B, 2A-B, 3A-C, 4, 5, 10, 11, 12A-C and 13-15, by way of examples, the present disclosure is directed to a method 1000 for coating a bore 202. FIG. 1A discloses an example of the applicator tool 100. FIG. 1B shows a cross-section of the applicator tool 100 of FIG. 1A. FIGS. 2A-B provide functional diagrams showing the applicator tool 100 used to apply a coating material 204 to a surface of a bore 202. FIGS. 3A-C show examples of several types of the tubular bodies 102 that may be implemented in the applicator tool 100. FIG. 3 shows the applicator tool 100 coupled to a rotational drive assembly 402. FIG. 5 shows an example of an inflatable bladder 114 for the applicator tool 100 connected to a compressed fluid source 502. FIGS. 10, 11, 12A-C. 13 and 14 disclose various examples of the method 1000. FIG. 15 is an exploded view of a casting block 1502 used to cast a coating material 204 on an expansion portion 110 of the applicator tool 100.

With reference again to FIGS. 1A, 1B, 2A-B, 3A-C, 4, 5, 10, 11, 12A-C and 13-15, in one or more examples, a method 1000 (see FIG. 10) for coating a bore 202 includes inserting 1002 an expansion portion 110 of an applicator tool 100 into the bore 202. A coating material 204 having been previously disposed on the expansion portion. At 1004, a pressurized fluid 504 is applied to the applicator tool 100 to expand the expansion portion 110 within the bore 202. At 1006, the applicator tool 100 is rotated to apply the coating material 204 from the expansion portion 110 to the bore 202.

In another example of the method 1000, the coating material 204 includes a conductive gap filler, indium, an indium alloy, tin, a tin alloy, lead, a lead alloy, a copper, a copper alloy, a silver, a silver alloy, a gold, a gold alloy, a platinum, a platinum alloy, a graphite, a graphite alloy or any other suitable coating material in any suitable combination.

In yet another example, the method 1000 also includes receiving 1008 the coating material 204 on the expansion portion 110 of the applicator tool 100. In this example, the method 1000 continues from 1008 to 1002.

In a further example, the receiving 1008 of the coating material 204 includes inserting 1102 (see FIG. 11) the expansion portion 110 of the applicator tool 100 into a casting bore 1504 of a casting block 1502. At 1104, the coating material 204 is heated to a molten liquid form. At 1106, the coating material 204 in the molten liquid form is cast on the expansion portion 110 of the applicator tool 100. At 1108, the expansion portion 110 of the applicator tool 100 is removed from the casting bore 1504 of the casting block 1502. In an even further example, the casting 1106 of the coating material 204 includes rotating 1202 (see FIG. 12A) the applicator tool 100 while the expansion portion 110 is inserted into the casting bore 1504 in conjunction with the casting 1106.

In another even further example, prior to the inserting 1102 of the expansion portion 110, the receiving 1008 of the coating material 204 also includes removing 1204 (see FIG. 12B) an inflatable bladder 114 from an internal volume 112 within the applicator tool 100. At 1206, an elongated tubular blank 1506 is inserted into the internal volume 112. In an even yet further example, the receiving 1008 of the coating material 204 also includes continuing from the removing 1108 of the expansion portion 110 of the applicator tool 100 from the casting bore 202 to removing 1208 (see FIG. 12C) the elongated tubular blank 1506 from the internal volume 112 within the applicator tool 100. At 1210, the inflatable bladder 114 is inserted into the internal volume 112.

In another further example, the receiving 1008 of the coating material 204 includes inserting 1302 (see FIG. 13) a plurality of coated inserts 310 into a corresponding plurality of openings 308 in the expansion portion 110 of the applicator tool 100. Each coated insert 310 includes a substrate 312 with the coating material 204 previously deposited on the substrate 312. In an even further example, prior to the inserting 1302 of the plurality of coated inserts, the receiving 1008 of the coating material 204 also includes removing 1304 an inflatable bladder 114 from an internal volume 112 within the applicator tool (100) to facilitate the inserting of the plurality of coated inserts. In an even yet further example, after the inserting 1302 of the plurality of coated inserts 310, the receiving 1008 of the coating material 204 also includes inserting 1306 the inflatable bladder 114 into the internal volume 112.

In still another example of the method 1000, the applying 1004 of the pressurized fluid 504 includes applying 1402 (see FIG. 14) the pressurized fluid 504 to an inflatable bladder 114 disposed in an internal volume 112 of the applicator tool 100. The inflatable bladder 114 expands in response to the pressurized fluid 504. The expansion of the inflatable bladder 114 applies an expansive force to the expansion portion 110 of the applicator tool 100.

In still yet another example of the method 1000, the rotating 1006 of the applicator tool 100 includes coupling 1404 (see FIG. 14) a rotational drive assembly 402 to a proximal end 104 of the applicator tool 100. At 1406, the rotational drive assembly 402 is operated to rotate the applicator tool 100. In a further example, the rotational drive assembly 402 includes a hand tool, a power hand tool, a robotic arm or any other suitable rotational drive assembly in any suitable combination.

In another example, the method 1000 also includes removing 1010 (see FIG. 10) the pressurized fluid 504 from the applicator tool 100 to release expansion of the expansion portion 110. At 1012, the expansion portion 110 of the applicator tool 100 is removed from the bore 202.

Figure 16:
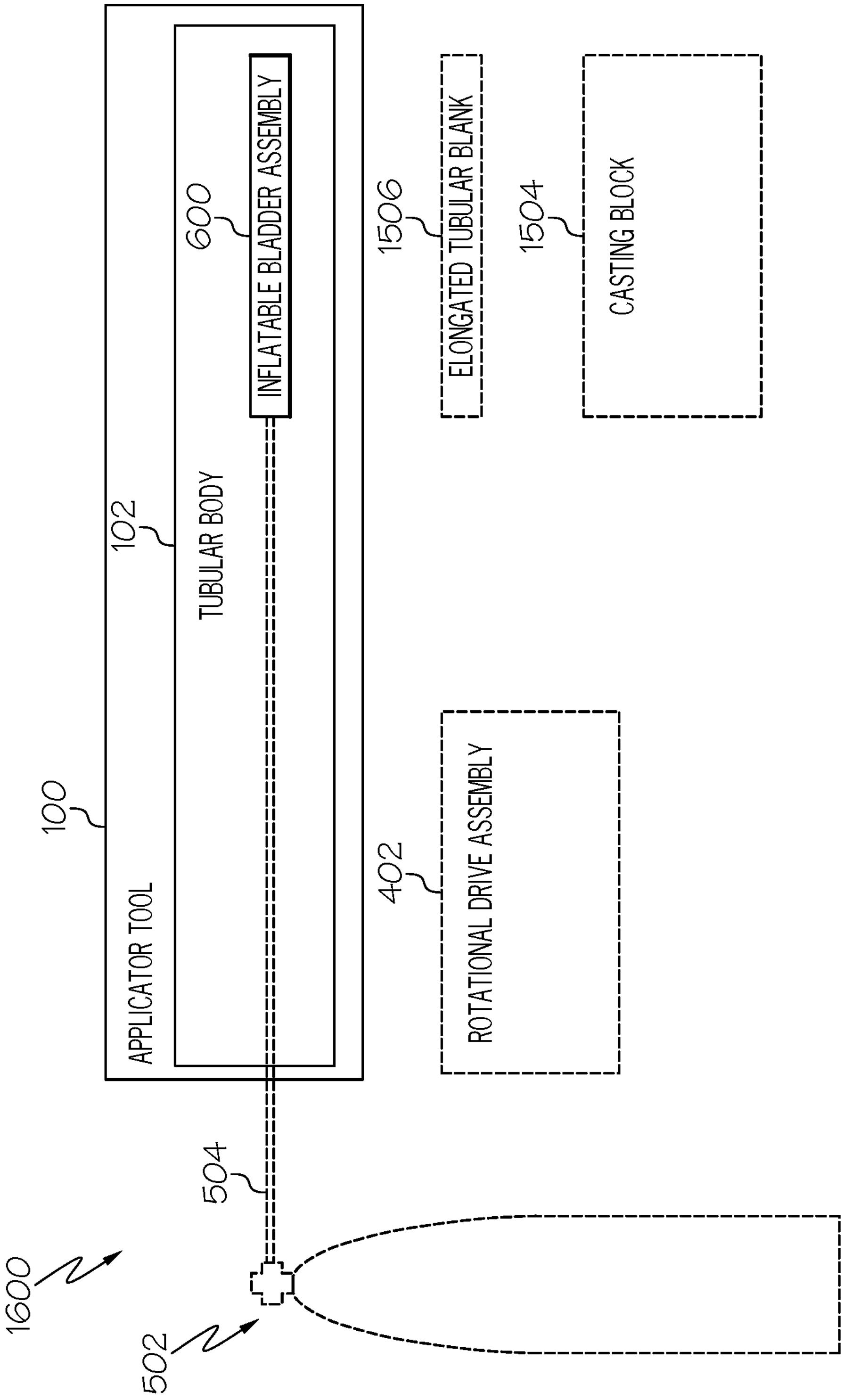
FIG. 16 is a functional block diagram of an example of a system for coating a bore.

Referring generally to FIGS. 1A, 1B, 2A-B, 3A-C, 4-9, 15 and 16, by way of examples, the present disclosure is directed to a system 1600 for coating a bore 202. FIG. 1A discloses an example of the applicator tool 100. FIG. 1B shows a cross-section of the applicator tool 100 of FIG. 1A. FIGS. 2A-B provide functional diagrams showing the applicator tool 100 used to apply a coating material 204 to a surface of a bore 202. FIGS. 3A-C show examples of several types of the tubular bodies 102 that may be implemented in the applicator tool 100. FIG. 3 shows the applicator tool 100 coupled to a rotational drive assembly 402. FIG. 5 shows an example of an inflatable bladder 114 for the applicator tool 100 connected to a compressed fluid source 502. FIG. 6 provides an exploded view of an inflatable bladder assembly 600 that may be implemented in the applicator tool 100. FIG. 7 provides an exploded view of another example of the applicator tool 100. FIG. 8 provides a functional diagram showing the inflatable bladder 114 for the applicator tool 100 connected to a compressed fluid source 502 via a rotation air inlet coupling 704. FIG. 9 provides a functional diagram showing the inflatable bladder 114 for the applicator tool 100 connected to a compressed fluid source 502 via a rotation air inlet connector 902. FIG. 15 is an exploded view of a casting block 1502 used to cast a coating material 204 on an expansion portion 110 of the applicator tool 100. FIG. 16 provides a functional diagram of the system 1600.

With reference again to FIGS. 1A, 1B, 2A-B, 3A-C, 4-9, 15 and 16, in one or more examples, a system 1600 for coating a bore includes an applicator tool 100 configured to coat a bore 202. The applicator tool 100 includes a tubular body 102 and an inflatable bladder assembly 600. The tubular body 102 includes a proximal end 104 and a distal end 106 opposing the proximal end 104 along a longitudinal axis 108 of the tubular body 102. The tubular body 102 also includes an expansion portion 110 proximate the distal end 106 and an internal volume 112 in relation to the expansion portion 110. The inflatable bladder assembly 600 disposed within the internal volume 112 of the tubular body 102 in relation to the expansion portion 110. The inflatable bladder assembly 600 includes an inflatable bladder 114, a first end member 606, a first sleeve 612, a second end member 614 and a second sleeve 620. The an inflatable bladder 114 includes a first open end 602 closer to the proximal end 104 of the tubular body 102 and a second open end 604 closer to the distal end 106 of the tubular body 102. The first end member 606 includes a first portion 608 sized for insertion into the internal volume 112 and a second portion 610 sized for insertion into the first open end 602 of the inflatable bladder 114. The first sleeve 612 securing the first open end 602 of the inflatable bladder 114 on the second portion 610 of the first end member 606. The first sleeve 612 sealing the first open end 602 of the inflatable bladder 114. The second end member 614 includes a first portion 616 sized for insertion into the internal volume 112 and a second portion 618 sized for insertion into the second open end 604 of the inflatable bladder 114. The second sleeve 620 securing the second open end 604 of the inflatable bladder 114 on the second portion 618 of the second end member 614. The second sleeve 620 sealing the second open end 604 of the inflatable bladder 114.

In another example of the system 1600, the expansion portion 110 of the tubular body 102 includes a plurality of interleaved fingers 302 cut into a surface 304 of the tubular body 102 to form the expansion portion 110 such that the expansion portion 110 is integrally formed with the tubular body 102. In a further example, the plurality of interleaved fingers 302 are configured to receive a coating material 204 for coating the bore 202. In an even further example, the system also includes a casting block 1502 configured to receive the expansion portion 110 of the tubular body 102 in a casting bore 1504. The casting block 1502 is also configured to heat the coating material 204 to a molten liquid form. The casting block 1502 is further configured to cast the coating material 204 in the molten liquid form on the expansion portion 110 of the tubular body 102. In an even yet further example, the casting block 1502 is configured to cast the coating material 204 on the expansion portion 110 in response to rotation of the applicator tool 100. In another even yet further example, the system 1600 also includes an elongated tubular blank 1506 configured for insertion into the internal volume 112 of the tubular body 102 in place of the inflatable bladder assembly 600 in conjunction with use of the casting block 1502 to cast the coating material 204 on the expansion portion 110 of the tubular body 102.

In yet another example of the system 1600, the expansion portion 110 of the tubular body 102 includes a plurality of cutouts 306 in a surface 304 of the tubular body 102 to form openings 308 in the expansion portion 110. In a further example, the expansion portion 110 of the tubular body 102 also includes a plurality of coated inserts 310 underlying the plurality of cutouts 306. Each coated insert 310 includes a substrate 312 with a coating material 204 previously deposited on the substrate 312 for coating the bore 202.

In still another example, the system 1600 also includes a rotational drive assembly 402 configured for coupling with the proximal end 104 of the tubular body 102 for rotation of the applicator tool 100. In a further example, the rotational drive assembly 402 includes a hand tool, a power hand tool, a robotic arm or any other suitable rotational drive assembly in any suitable combination. In another further example, the expansion portion 110 of the tubular body 102 is configured to coat the bore 202 with a coating material 204 in response to rotation of the applicator tool 100 by the rotational drive assembly 402.

In still yet another example, the system 1600 also includes a compressed fluid source 502 in fluid communication with the inflatable bladder 114 and configured to selectively apply a pressurized fluid 504 to the inflatable bladder 114. The inflatable bladder 114 is configured to expand in response to the pressurized fluid 504. The expansion of the inflatable bladder 114 applies an expansive force to the expansion portion 110 of the tubular body 102 in response to the pressurized fluid 504.

In another example of the system 1600, the inflatable bladder assembly 600 also includes a rod member 622 extending between the first end member 606 and the second end member 614 along the longitudinal axis 108 of the tubular body 102. The rod member 622 disposed within the inflatable bladder 114 and configured to provide longitudinal support to the inflatable bladder assembly 600 in relation to insertion and extraction of the inflatable bladder assembly 600 from the internal volume 112 of the tubular body 102. In a further example, the rod member 622 includes a threaded rod 624 received within a first threaded bore 626 of the first end member 606 and a second threaded bore 628 of the second end member 614.

In yet another example of the system 1600, the applicator tool 100 also includes a rotation air inlet coupling 704, a first retaining mechanism 714, a second retaining mechanism 716 and an air inlet path 802. The rotation air inlet coupling 704 includes a central bore 706 along the longitudinal axis 108 of the tubular body 102. The tubular body 102 is inserted through the central bore 706 such that the rotation air inlet coupling 704 is disposed proximate a central portion 708 of the tubular body 102 between the proximal end 104 and the expansion portion 110. The rotation air inlet coupling 704 also includes a first end 710 closer to the proximal end 104 of the tubular body 102 and a second end 712 closer to the expansion portion 110 of the tubular body 102. The first retaining mechanism 714 disposed on the tubular body 102 at the first end 710 of the rotation air inlet coupling 704 to prevent the rotation air inlet coupling 704 from movement toward the proximal end 104. The second retaining mechanism 716 disposed on the tubular body 102 at the second end 712 of the rotation air inlet coupling 704 to prevent the rotation air inlet coupling 704 from movement toward the expansion portion 110. The air inlet path 802 extends from the rotation air inlet coupling 704 to the inflatable bladder 114 within the tubular body 102.

In still another example of the system 1600, the applicator tool 100 also includes a rotation air inlet connector 902 an air inlet path 904. The rotation air inlet connector 902 disposed at or near the proximal end 104 of the tubular body 102 along the longitudinal axis 108 of the tubular body 102. The air inlet path 904 extends from the rotation air inlet connector 902 to the inflatable bladder 114 within the tubular body 102.

Examples of applicator tools 100, methods 1000 and systems 1600 for coating a bore may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of composite products in the manufacture of various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word “a” or “an” should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to “example” means that one or more feature, structure, element, component, characteristic and/or operational step described in connection with the example is included in at least one aspect, embodiment and/or implementation of the subject matter according to the present disclosure. Thus, the phrases “an example,” “another example,” “one or more examples,” and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware “configured to”

perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1A, 1B, 2A-B, 3A-C, 4-9, 15 and 16, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1A, 1B, 2A-B, 3A-C, 4-9, 15 and 16, referred to above, need be included in every example and not all elements, features and/or components described herein are necessarily depicted in each illustrative example. Accordingly, some of the elements, features and/or components described and illustrated in FIGS. 1A, 1B, 2A-B. 3A-C, 4-9, 15 and 16 may be combined in various ways without the need to include other features described and illustrated in FIGS. 1A, 1B, 2A-B, 3A-C, 4-9, 15 and 16, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1A, 1B, 2A-B, 3A-C, 4-9, 15 and 16, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1A, 1B, 2A-B, 3A-C, 4-9, 15 and 16 and such elements, features and/or components may not be discussed in detail herein with reference to each of FIGS. 1A, 1B, 2A-B, 3A-C, 4-9, 15 and 16. Similarly, all elements, features and/or components may not be labeled in each of FIGS. 1A, 1B, 2A-B, 3A-C, 4-9, 15 and 16, but reference numerals associated therewith may be utilized herein for consistency.

In FIGS. 10, 11, 12A-C, 13 and 14, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 10, 11, 12A-C, 13 and 14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages and similar language used throughout the present disclosure may, but does not necessarily, refer to the same example.

Figure 17:
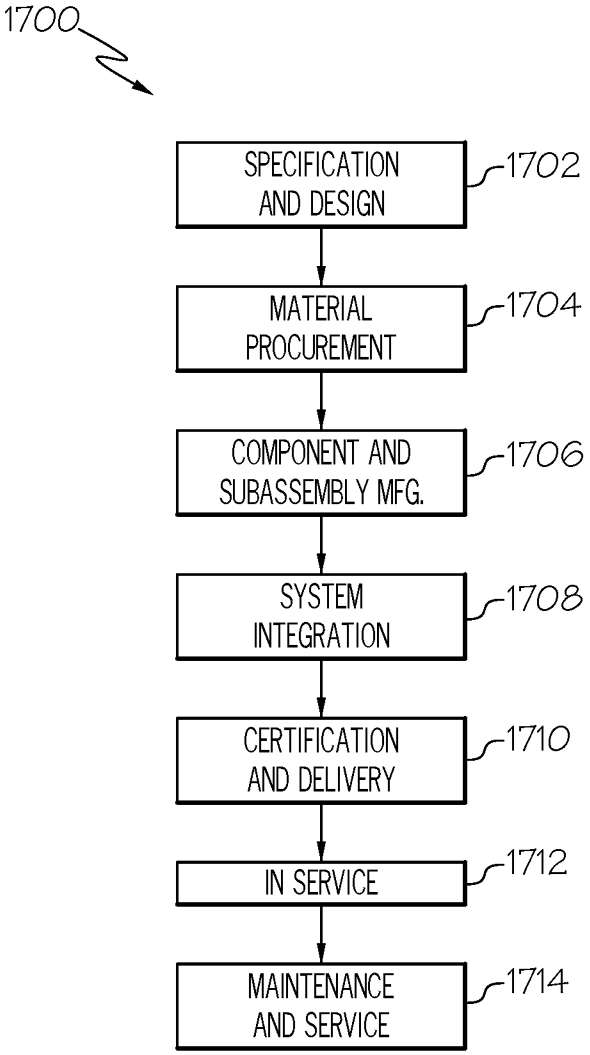
FIG. 17 is a block diagram of aircraft production and service methodology that implements one or more of the examples of methods for coating a bore disclosed herein.
Figure 18:
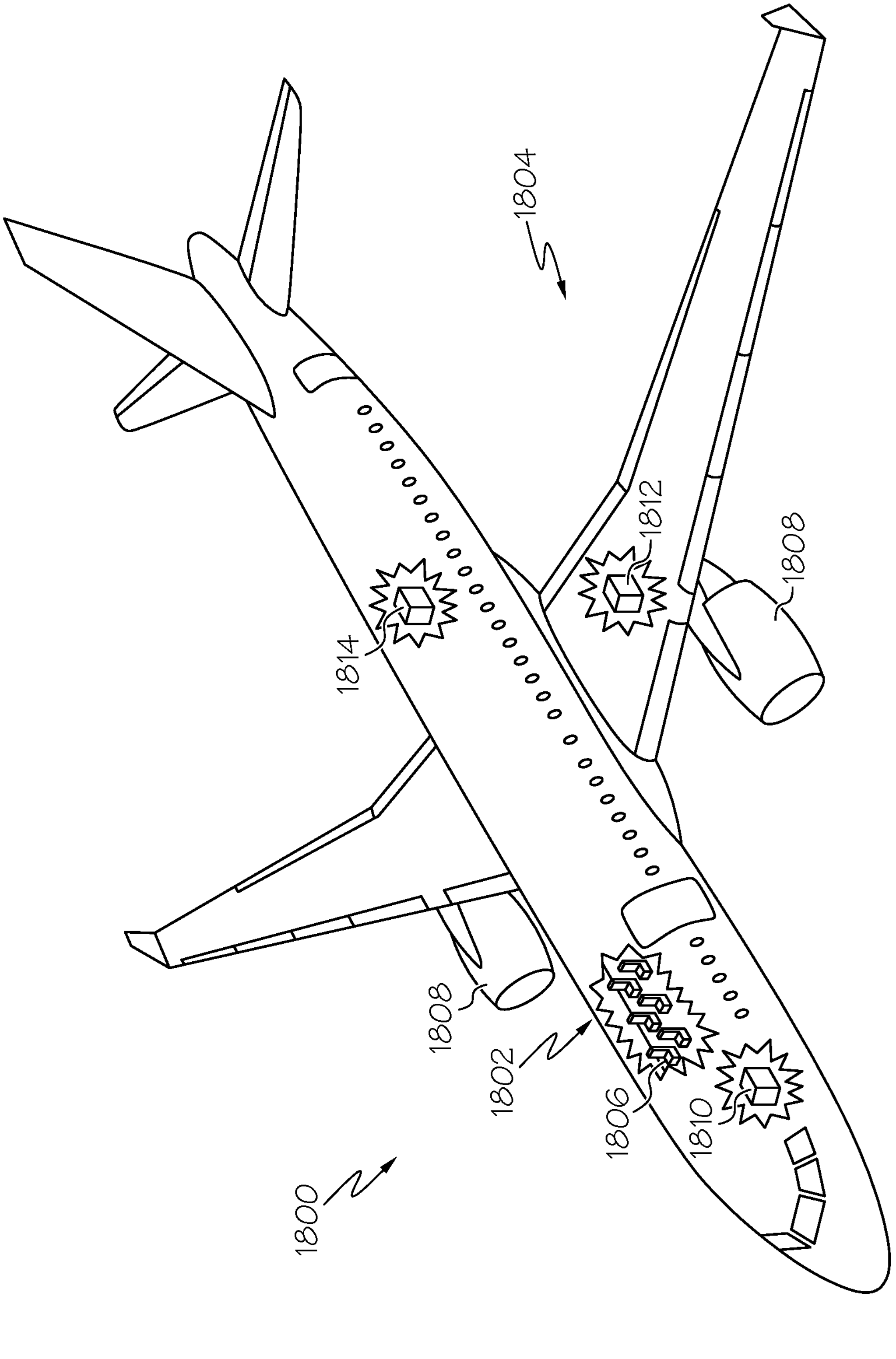
FIG. 18 is a schematic illustration of an aircraft that incorporates fastener holes coated with a coating material using one or more of the examples of applicator tools, methods and systems for coating a bore disclosed herein.

Examples of the subject matter disclosed herein may be described in the context of aircraft manufacturing and service method 1700 as shown in FIG. 17 and aircraft 1800 as shown in FIG. 18. In one or more examples, the disclosed methods and systems for associating test data for a part under test with an end item coordinate system may be used in aircraft manufacturing. During pre-production, the service method 1700 may include specification and design (block 1702) of aircraft 1800 and material procurement (block 1704). During production, component and subassembly manufacturing (block 1706) and system integration (block 1708) of aircraft 1800 may take place. Thereafter, aircraft 1800 may go through certification and delivery (block 1710) to be placed in service (block 1712). While in service, aircraft 1800 may be scheduled for routine maintenance and service (block 1714). Routine maintenance and service may include modification, reconfiguration, refurbishment, etc. of one or more systems of aircraft 1800.

Each of the processes of the service method 1700 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 18, aircraft 1800 produced by the service method 1700 may include airframe 1802 with a plurality of high-level systems 1804 and interior 1806. Examples of high-level systems 1804 include one or more of propulsion system 1808, electrical system 1810, hydraulic system 1812 and environmental system 1814. Any number of other systems may be included. Although an aerospace example is shown, the principles disclosed herein may be applied to other industries, such as the automotive industry. Accordingly, in addition to aircraft 1800, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 1700. For example, components or subassemblies corresponding to component and subassembly manufacturing (block 1706) may be fabricated or manufactured in a manner similar to components or subassemblies produced while aircraft 1800 is in service (block 1712). Also, one or more examples of the system(s), method(s), or combination thereof may be utilized during production stages (block 1706 and block 1708), for example, by substantially expediting assembly of or reducing the cost of aircraft 1800. Similarly, one or more examples of the system or method realizations, or a combination thereof, may be utilized, for example and without limitation, while aircraft 1800 is in service (block 1712) and/or during maintenance and service (block 1714).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the applicator tools 100, methods 1000 and systems 1600 for coating a bore have been shown and described, modifications may occur to those skilled in the art upon reading the specification. The present application includes such modifications and is limited only by the scope of the claims.

What is claimed is:

1. An applicator tool for coating a bore, comprising:

a tubular body comprising a proximal end and a distal end opposing the proximal end along a longitudinal axis of the tubular body, the tubular body further comprising a surface between the proximal end and the distal end, an expansion portion proximate the distal end and an internal volume in relation to the expansion portion, wherein the expansion portion comprises at least one cut in the surface; and an inflatable bladder disposed within the internal volume of the tubular body in relation to the expansion portion, wherein the inflatable bladder comprises a first open end closer to the proximal end of the tubular body and a second open end closer to the distal end of the tubular body.

2. The applicator tool of claim 1, the expansion portion of the tubular body comprising:

a plurality of interleaved fingers cut into the surface of the tubular body to form the expansion portion such that the expansion portion is integrally formed with the tubular body.

3. The applicator tool of claim 2 wherein the plurality of interleaved fingers are configured to receive a coating material for coating the bore.

4. The applicator tool of claim 1, the expansion portion of the tubular body comprising:

a plurality of cutouts in the surface of the tubular body to form openings in the expansion portion.

5. The applicator tool of claim 4, the expansion portion of the tubular body further comprising:

a plurality of coated inserts underlying the plurality of cutouts, each coated insert comprising a substrate with a coating material previously deposited on the substrate for coating the bore.

6. The applicator tool of claim 1 wherein the applicator tool is sized for insertion into the bore.

7. The applicator tool of claim 1 wherein the proximal end of the tubular body is configured for coupling with a rotational drive assembly.

8. The applicator tool of claim 7 wherein the expansion portion of the tubular body is configured to coat the bore with a coating material in response to rotation of the applicator tool by the rotational drive assembly.

9. The applicator tool of claim 1 wherein the inflatable bladder is configured for fluid communication with a compressed fluid source to expand the inflatable bladder in response to pressurized fluid received from the compressed fluid source, the expansion of the inflatable bladder applying an expansive force to the expansion portion of the tubular body in response to the pressurized fluid.

10. The applicator tool of claim 9 wherein the inflatable bladder is configured to deflate in response to removal of the pressurized fluid and to release the expansive force on the expansion portion of the tubular body in response to the removal of the pressurized fluid.

11. The applicator tool of claim 1 wherein the inflatable bladder is configured for insertion into the tubular body at the distal end.

12. The applicator tool of claim 1, further comprising:

an inflatable bladder assembly disposed within the internal volume of the tubular body in relation to the expansion portion, the inflatable bladder assembly comprising:

the inflatable bladder;

a first end member comprising a first portion sized for insertion into the internal volume and a second portion sized for insertion into the first open end of the inflatable bladder;

a first sleeve securing the first open end of the inflatable bladder on the second portion of the first end member, the first sleeve sealing the first open end of the inflatable bladder;

a second end member comprising a first portion sized for insertion into the internal volume and a second portion sized for insertion into the second open end of the inflatable bladder; and a second sleeve securing the second open end of the inflatable bladder on the second portion of the second end member, the second sleeve sealing the second open end of the inflatable bladder.

13. The applicator tool of claim 12, the inflatable bladder assembly further comprising:

a rod member extending between the first end member and the second end member along the longitudinal axis of the tubular body, the rod member disposed within the inflatable bladder and configured to provide longitudinal support to the inflatable bladder assembly in relation to insertion and extraction of the inflatable bladder assembly from the internal volume of the tubular body.

14. The applicator tool of claim 12, further comprising:

a bladder retaining mechanism securing the inflatable bladder assembly within the internal volume of the tubular body.

15. The applicator tool of claim 1, further comprising:

a rotation air inlet coupling comprising a central bore along the longitudinal axis of the tubular body, the tubular body inserted through the central bore such that the rotation air inlet coupling is disposed proximate a central portion of the tubular body between the proximal end and the expansion portion, the rotation air inlet coupling further comprising a first end closer to the proximal end of the tubular body and a second end closer to the expansion portion of the tubular body;

a first retaining mechanism disposed on the tubular body at the first end of the rotation air inlet coupling to prevent the rotation air inlet coupling from movement toward the proximal end;

a second retaining mechanism disposed on the tubular body at the second end of the rotation air inlet coupling to prevent the rotation air inlet coupling from movement toward the expansion portion; and an air inlet path extending from the rotation air inlet coupling to the inflatable bladder within the tubular body.

16. The applicator tool of claim 15 wherein the rotation air inlet coupling is configured for fluid communication with a compressed fluid source to supply a pressurized fluid received from the compressed fluid source to the inflatable bladder via the air inlet path, the inflatable bladder configured to expand in response to receipt of the pressurized fluid, expansion of the inflatable bladder applying an expansive force to the expansion portion of the tubular body in response to the pressurized fluid.

17. The applicator tool of claim 1, further comprising:

a rotation air inlet connector disposed at or near the proximal end of the tubular body along the longitudinal axis of the tubular body; and an air inlet path extending from the rotation air inlet connector to the inflatable bladder within the tubular body.

18. A method for coating a bore, comprising:

inserting the expansion portion of the applicator tool of claim 1 into the bore, a coating material having been previously disposed on the expansion portion;

applying a pressurized fluid to the applicator tool to expand the expansion portion within the bore; and rotating the applicator tool to apply the coating material from the expansion portion to the bore.

19. An applicator tool for coating a bore, comprising:

a tubular body comprising a proximal end and a distal end opposing the proximal end along a longitudinal axis of the tubular body, the tubular body further comprising an expansion portion proximate the distal end and an internal volume in relation to the expansion portion;

an inflatable bladder disposed within the internal volume of the tubular body in relation to the expansion portion;

a rotation air inlet connector disposed at or near the proximal end of the tubular body along the longitudinal axis of the tubular body; and an air inlet path extending from the rotation air inlet connector to the inflatable bladder within the tubular body.

20. An applicator tool for coating a bore, comprising:

a tubular body comprising a proximal end and a distal end opposing the proximal end along a longitudinal axis of the tubular body, the tubular body further comprising an expansion portion proximate the distal end and an internal volume in relation to the expansion portion;

an inflatable bladder disposed within the internal volume of the tubular body in relation to the expansion portion, wherein the expansion portion of the tubular body comprises a plurality of cutouts in a surface of the tubular body to form openings in the expansion portion, and wherein the expansion portion of the tubular body further comprises a plurality of coated inserts underlying the plurality of cutouts, each coated insert comprising a substrate with a coating material previously deposited on the substrate for coating the bore.

* * * * *